US008682058B2

(12) United States Patent
Yamada

(10) Patent No.: US 8,682,058 B2
(45) Date of Patent: Mar. 25, 2014

(54) DEFECT ANALYSIS METHOD, APPARATUS, AND RECORDING MEDIUM USING PATTERN DEPENDENCE DEGREE

(75) Inventor: Yasuyuki Yamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 570 days.

(21) Appl. No.: 13/006,037

(22) Filed: Jan. 13, 2011

(65) Prior Publication Data

US 2011/0286657 A1  Nov. 24, 2011

(30) Foreign Application Priority Data

May 20, 2010  (JP) .................................. 2010-116615

(51) Int. Cl.
*G06K 9/00* (2006.01)
(52) U.S. Cl.
USPC .......................................... 382/141; 382/149
(58) Field of Classification Search
USPC .................................................. 382/141, 149
See application file for complete search history.

(56) References Cited

U.S. PATENT DOCUMENTS

| 6,501,822 | B2 * | 12/2002 | Roder .............................. 378/22 |
| 2005/0244049 | A1 * | 11/2005 | Onishi et al. ................... 382/141 |
| 2006/0269120 | A1 | 11/2006 | Nehmadi et al. |
| 2007/0053580 | A1 * | 3/2007 | Ishikawa ........................ 382/149 |
| 2007/0288219 | A1 | 12/2007 | Zafar et al. |
| 2010/0106447 | A1 | 4/2010 | Yamada |

FOREIGN PATENT DOCUMENTS

| JP | 2001-160572 | 6/2001 |
| JP | 2006-253409 | 9/2006 |
| JP | 2008-262014 | 10/2008 |

OTHER PUBLICATIONS

Yamada, Y., "Inspection Area Setting Method, Inspection Area Setting Apparatus, and Computer Program Product," U.S. Appl. No. 12/697,574, filed Feb. 1, 2010.
Sato, Y. et al., "Defect Criticality Index (DCI): A New Methodology to Significantly Improve DOI Sampling Rate in a 45nm Production Environment," Proc. of the SPIE 2008, vol. 6922, pp. 692213 (9 pages), (2008).
Notice of Rejection issued by the Japanese Patent Office on Nov. 26, 2013, for Japanese Patent Application No. 2010-116615, and English-language translation thereof.

* cited by examiner

*Primary Examiner* — Hadi Akhavannik
(74) *Attorney, Agent, or Firm* — Finnegan, Henderson, Farabow, Garrett & Dunner, L.L.P.

(57) ABSTRACT

According to the embodiments, a plurality of positional relationships between a coordinate system for indicating a defect position on a wafer that is used by an inspection device and a coordinate system that is used in design data on a pattern is set, the defect position output by the inspection device and the design data are aligned by using each of the set positional relationships, and a local pattern of a portion in which the defect position is aligned is extracted from the design data for each positional relationship. Then, the extracted local pattern is classified based on a degree of matching of graphical feature. The number of classification patterns is calculated for each positional relationship. Then, a pattern dependence degree of the detected defect group is calculated by using the calculated number of classification patterns of each positional relationship.

14 Claims, 12 Drawing Sheets

US 8,682,058 B2

DEFECT ANALYSIS METHOD, APPARATUS, AND RECORDING MEDIUM USING PATTERN DEPENDENCE DEGREE

CROSS-REFERENCE TO RELATED APPLICATIONS

This application is based upon and claims the benefit of priority from the prior Japanese Patent Application No. 2010-116615, filed on May 20, 2010; the entire contents of which are incorporated herein by reference.

FIELD

Embodiments described herein relate generally to a defect analysis method, a defect analysis apparatus, and a recording medium.

BACKGROUND

Defects that cause decrease in yield in a manufacturing process of a semiconductor integrated circuit are classified roughly into a random defect mainly due to a manufacturing apparatus and particles generated in a process and a systematic defect due to process variations. The random defect and the systematic defect are different in countermeasure contents for a process modification. Therefore, it is important to evaluate which one of the random defect and the systematic defect increases when the number of defects increases for efficiently keeping the yield high.

In Non-Patent Document 1 (Y. Sato et al. "Defect criticality index (DCI): a new methodology to significantly improve DOI sampling rate in 45 nm production environment": Proc. of SPIE Vol. 6922, 692213 (2008)), a method called DBB (Design Based Binning) in which a defect is classified based on a background pattern (local pattern) of the defect is introduced. The systematic defect includes many defect types having high pattern dependency, such as, a danger point due to OPE (Optical Proximity Effect). On the other hand, the random defect has little pattern dependency. Therefore, when generated defects are classified while concentrating on a specific pattern as a result of the classification based on the DBB, it is possible to determine that the systematic defect inherent in this pattern is generated.

DETAILED DESCRIPTION

According to embodiments, a plurality of positional relationships between a coordinate system for indicating a defect position on a wafer that is used by an inspection device and a coordinate system that is used in design data on a pattern is set, the defect position output by the inspection device and the design data are aligned by using each of the set positional relationships, and a local pattern of a portion in which the defect position is aligned is extracted from the design data for each positional relationship. Then, the extracted local pattern is classified based on a degree of matching of graphical feature. The number of classification patterns is calculated for each positional relationship. Then, a pattern dependence degree of the detected defect group is calculated by using the calculated number of classification patterns of each positional relationship.

Exemplary embodiments of a defect analysis method, a defect analysis apparatus, and a recording medium will be explained below in detail with reference to the accompanying drawings. The present invention is not limited to the following embodiments.

A defect analysis method, a defect analysis apparatus, and a recording medium according to the embodiments will be explained below in detail with reference to the accompanying drawings. The present invention is not limited to these embodiments.

Figure 1:
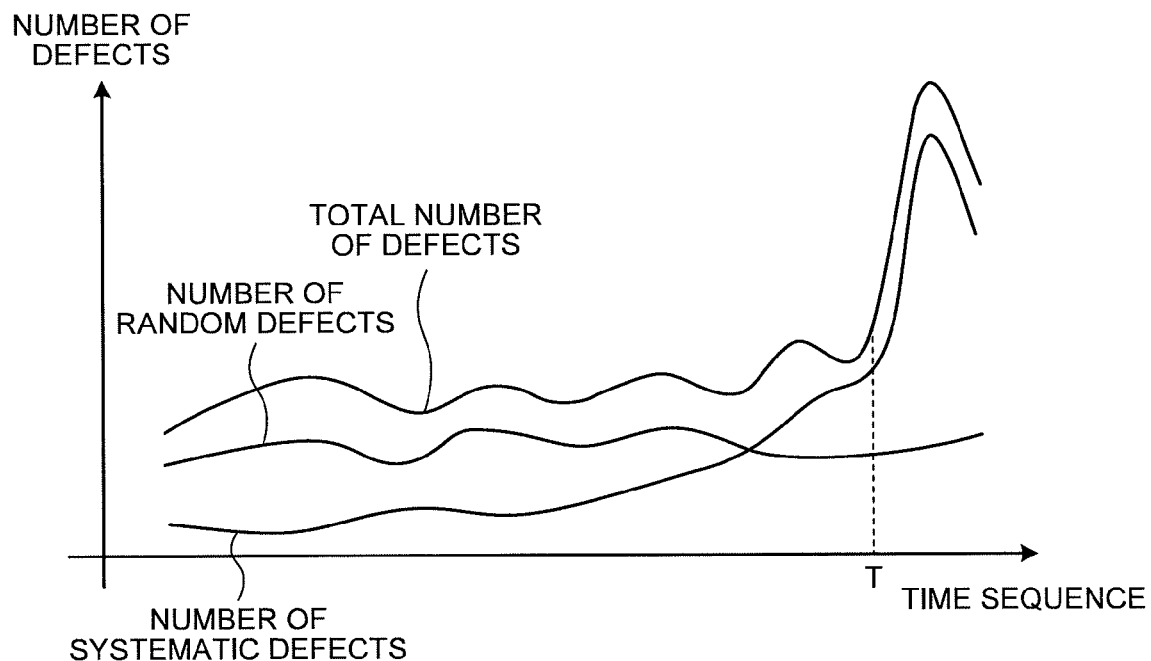
FIG. 1 is a graph illustrating a transition of the number of defects generated on a wafer on a production line.

In mass-production of semiconductor integrated circuits, a defect generated on a wafer flowing on a production line, on which a pattern of the semiconductor integrated circuit is formed, is monitored for controlling the quality. The number of defects generated on the wafer on the production line transitions, for example, as shown in FIG. 1. When rapid increase of the number of defects occurs as shown at a point of time T in FIG. 1, it is required to determine which one of a systematic defect and a random defect increases. For determining this, a degree to which the systematic defect (or random defect) is included in generated defects is desirably quantified and monitored, instead of monitoring only the number of defects. The defect analysis system in a first embodiment of the present invention quantifies the degree to which the systematic defect is included in a defect group.

Figure 2:
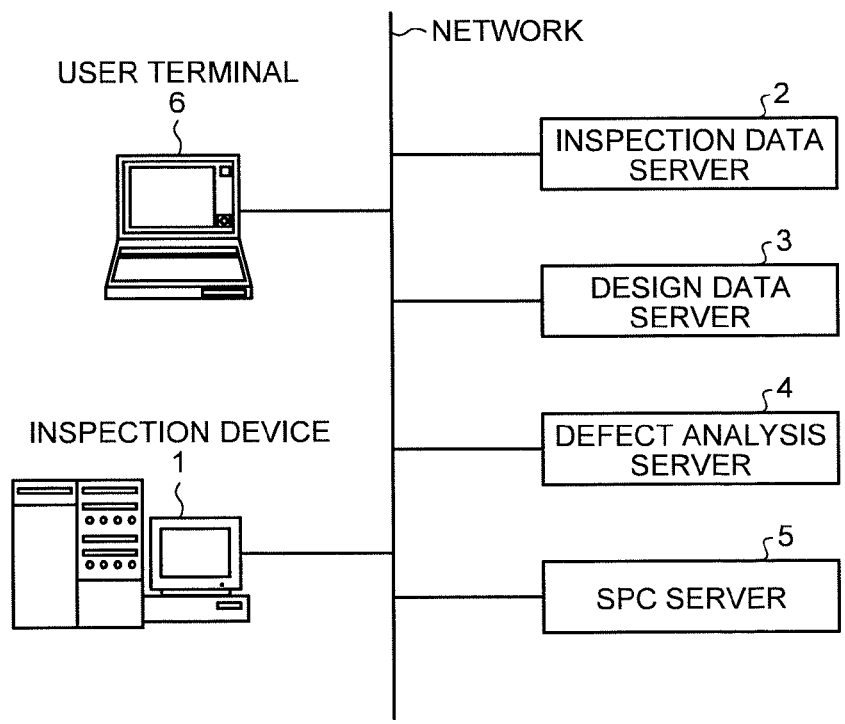
FIG. 2 is a diagram explaining a configuration of a defect analysis system in a first embodiment.

FIG. 2 is a diagram explaining a configuration of a defect analysis system in the first embodiment of the present invention. As shown in FIG. 1, the defect analysis system includes an inspection device 1, an inspection data server 2, a design data server 3, a defect analysis server 4, a statistical process control (SPC) server 5, and a user terminal 6. The inspection device 1, the inspection data server 2, the design data server 3, the defect analysis server 4, the SPC server 5, and the user terminal 6 are connected with each other by a network such as the Ethernet (trademark). The inspection device 1 is arranged to be incorporated in a production line of semiconductor integrated circuits, and sequentially performs a defect inspection on a wafer on the production line on which a pattern is formed. The inspection device 1 outputs inspection data in which defect position coordinates detected for each wafer are written. The inspection data is sent to the inspection data server 2. As the inspection device 1, for example, an SEM (Scanning Electron Microscope) is employed. As a coordinate system (inspection coordinate system) of the defect position coordinates, a coordinate system based on a reference point provided on a wafer as an inspection target is used.

The inspection data server 2 includes a storage area composed of a hard disk drive, a memory, or the like, and the inspection data output from the inspection device 1 is stored in the storage area.

The design data server 3 includes a storage area in the similar manner to the inspection data server 2, and the storage area stores therein design data in which a design pattern (or mask pattern) of a semiconductor integrated circuit is written to function as a database of the design data. The format of the design data is not specifically limited; however, for example, a GDS format can be employed. As a coordinate system (design coordinate system) of the design data, a coordinate system based on a reference point provided on the design data is used.

The defect analysis server 4 reads out the inspection data stored in the inspection data server 2 and the design data stored in the design data server 3 and calculates a value (pattern dependence degree) that is obtained by quantifying a pattern dependency of the defect group detected by the inspection device 1 based on the read out inspection data and design data. The defect analysis server 4 sequentially calculates the pattern dependence degree for each inspection data (for each wafer), and sends the calculated pattern dependence degree to the SPC server 5 together with the number of defects of each wafer.

The output unit of the inspection data in the inspection device 1 is not limited to a wafer unit and can be, for example, a die unit. Moreover, the output unit of the number of defects and the pattern dependence degree by the defect analysis server 4 is not limited to a wafer unit and can be, for example, a die unit.

The SPC server 5 performs control of the received number of defects and pattern dependence degree as feature amounts based on the SPC. The SPC is a control method of performing a statistical process by using data collected in a measuring process included in the manufacturing process of a semiconductor integrated circuit and controlling tendency of variation in a manufacturing condition and measured data in each measuring process. In this example, the SPC server 5 controls the number of defects and the pattern dependence degree in a time sequence and monitors transition of each of them, and, when one or both of the values exceeds a preset control limit value, triggers an alarm.

The user terminal 6 is a computer terminal for input and output for a user to operate the defect analysis system. The user inputs various operation contents for the inspection device 1, the inspection data server 2, the design data server 3, the defect analysis server 4, and the SPC server 5, to the user terminal 6. The input operation contents are transmitted to target components via the network. Moreover, the user terminal 6 receives output information in the inspection device 1, the inspection data server 2, the design data server 3, the defect analysis server 4, and the SPC server 5 via the network, and outputs the received output information to an output device such as a CRT display, a liquid crystal display, and a printer.

Figure 3:
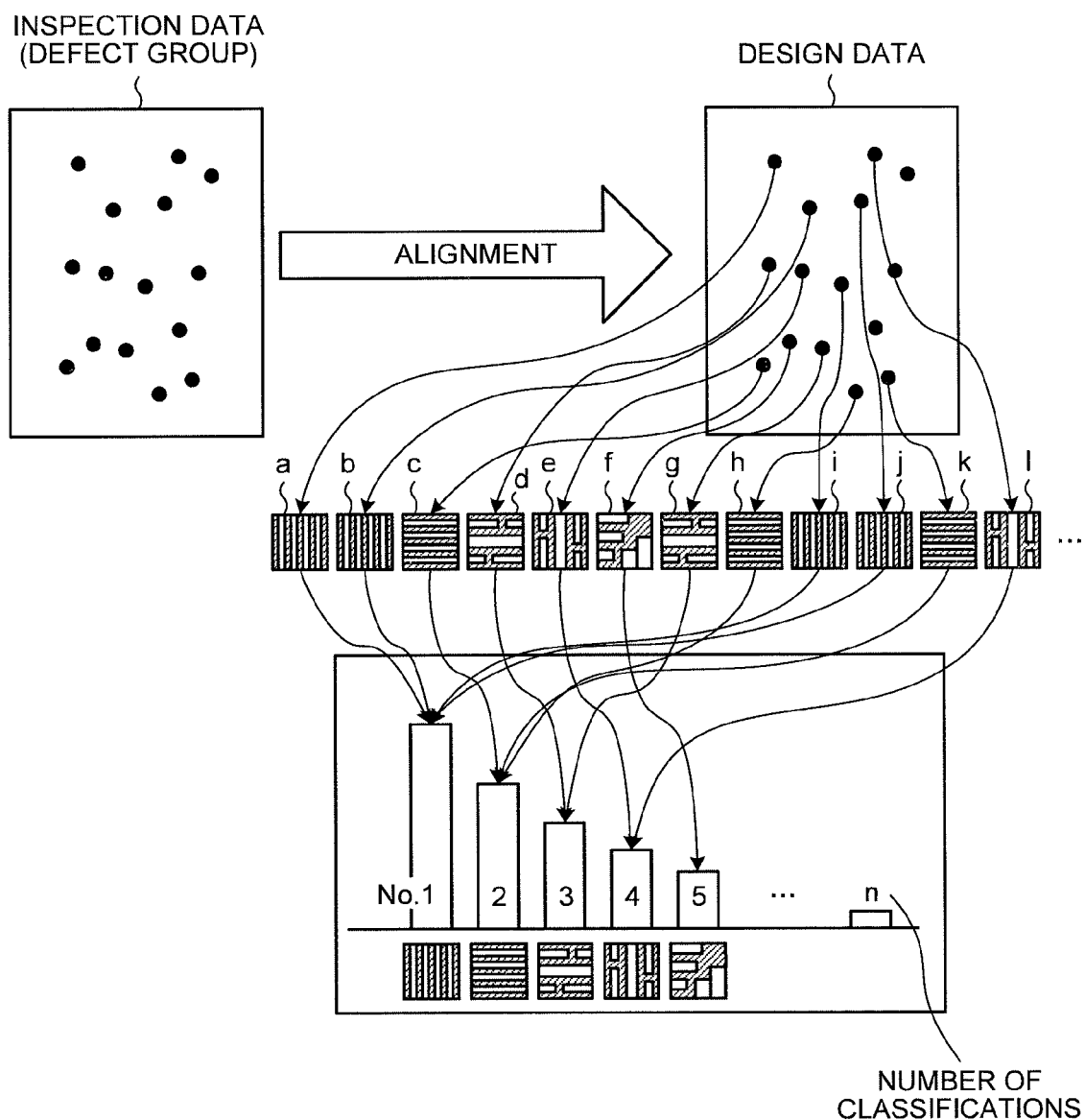
FIG. 3 is a diagram for explaining a concept of DBB.

Next, the above described DBB is explained. FIG. 3 is a diagram for explaining the concept of the DBB. With the DBB, a local pattern of each defect written in the inspection data is extracted from the design data based on an alignment. Then, extracted extraction patterns (a to l) are classified into n classification patterns (No. 1 to No. n) based on a degree of matching of graphical feature. In FIG. 3, 12 extraction patterns (extraction pattern a to l) extracted from the design data are classified into each of five classification patterns (classification patterns No. 1 to No. 5). The extraction patterns are classified into n classification patterns in total.

When the defect group is composed of only the random defects, the number of extraction patterns of each classification pattern tends to have little bias and the number of classification patterns n tends to become large. When the defect group includes the systematic defect, the bias of the number of extraction patterns of each classification pattern tends to become large and the number of classification patterns n tends to become small (tendency 1). In the example in FIG. 3, the number of extraction patterns classified into the classification pattern No. 1 is significantly larger than the number of extraction patterns classified into other classification patterns, so that it is found that the systematic defect is included in the inspection data.

The inventors found that when the defect group includes the systematic defect, the number of classification patterns tends to change (tendency 2) depending on the way of determining a positional relationship (alignment) between the inspection coordinate system and the design coordinate system. In the following, the tendency 2 is explained with reference to FIG. 4 to FIG. 6.

Figure 4:
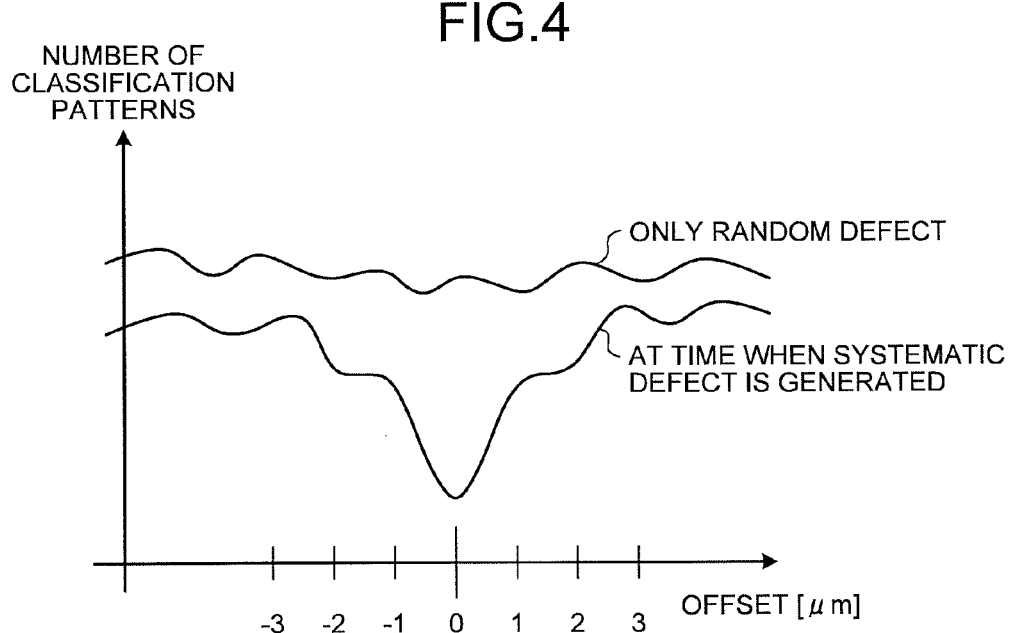
FIG. 4 is a graph illustrating a relationship between the number of classification patterns and a displacement amount of an alignment.

FIG. 4 is a graph in which the alignment is intentionally displaced from an appropriate alignment and the number of classification patterns is measured, and the measured result is plotted with a displacement amount (offset) from the appropriate alignment as a horizontal axis. As shown in FIG. 4, in the case where only the random defect is generated, the number of classification patterns shows an approximately constant value regardless of the displacement of the alignment. On the contrary, in the case where the systematic defect is included, when the alignment is appropriate, the number of classification patterns becomes a minimum value; however, when the alignment is displaced from the appropriate alignment, the number of classification patterns increases.

Figure 5:
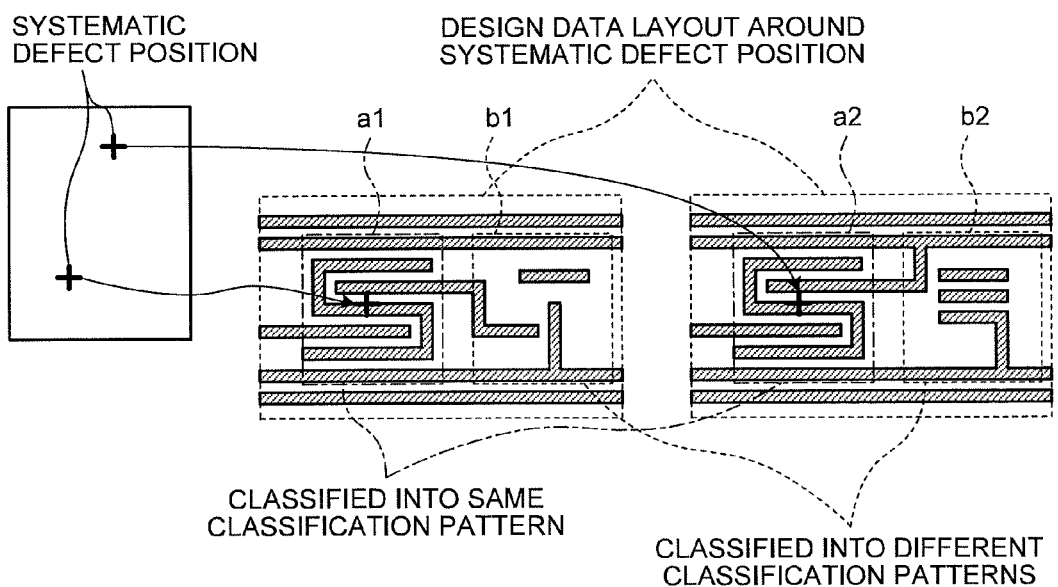
FIG. 5 is a diagram explaining a principle of causing change in the number of classification patterns of each alignment.

FIG. 5 is a diagram explaining a principle of causing the tendency 2. In FIG. 5, the systematic defects due to the local patterns having the same shape are detected at two locations for easy understanding. As shown in FIG. 5, when the alignment is appropriate, an extraction pattern a1 and an extraction pattern a2 that are the local patterns, causing the defects are accurately extracted from the defect positions, respectively, and the extracted extraction pattern a1 and extraction pattern a2 are classified into the same classification. In other words, the number of classification patterns is one. On the other hand, when the alignment is intentionally displaced from the appropriate alignment, an extraction pattern b1 and an extraction pattern b2 that are patterns entirely different from the extraction pattern a1 and the extraction pattern a2 are extracted from the positions different from the extraction pattern a1 and the extraction pattern a2, respectively. The extraction pattern b1 and the extraction pattern b2 have different shapes (graphical feature is different) and therefore are not classified into the same classification pattern. In other words, the number of classification patterns is two. Thus, it is understood that when the alignment is displaced from the appropriate alignment, the local patterns that could be extracted when the alignment is appropriate and cause the systematic defects cannot be extracted, which results in increasing the number of classification patterns.

When generated two defects are the random defects, the number of classification patterns is two regardless of whether the alignment is appropriate. Therefore, it can be understood that when the alignment is displaced from the appropriate alignment, the number of classification patterns approaches the number of classification patterns measured when the number of defects is the same and only the random defect is generated.

Figure 6:
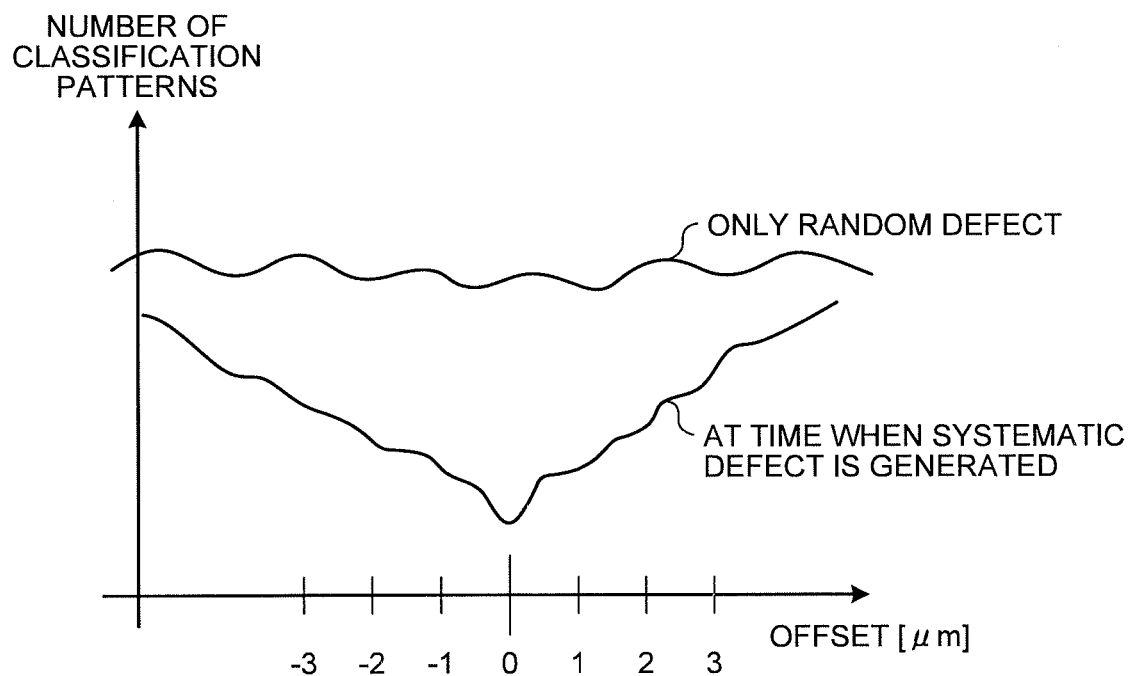
FIG. 6 is a graph illustrating a relationship between the number of classification patterns and the displacement amount of the alignment.

When the systematic defect is generated in a memory cell array, the defect appears many times in patterns having the same shape that are included in the memory cell array. Then, even if the alignment is displaced from the appropriate alignment and extraction positions are uniformly displaced, because the patterns having the same shape are regularly arranged in the memory cell array, patterns having the same shape with each other are extracted from the memory cell array, and the extracted patterns are classified into the same classification pattern. However, a pattern, which is a defect generated in the memory cell array and is extracted from a portion aligned to protrude outside the memory cell array portion in the design coordinate system due to displacement of the alignment, is not classified into the classification pattern same as the extraction pattern from this memory cell array portion. The number of defects that are not classified into the classification pattern same as the extraction pattern of this memory cell array portion increases in accordance with the displacement amount of the alignment. Therefore, when the systematic defect is generated in the memory cell array, as shown in FIG. 6, the number of classification patterns increases in accordance with the increase of the displacement amount and approaches to the number of classification patterns in the case where only the random defect is generated. The increasing rate in this case becomes small compared to the case where the systematic defect is generated in a portion other than the patterns, which are regularly arranged, such as in the memory cell array.

The systematic defects due to patterns having the same shape are classified into the same classification pattern, so that a large difference occurs in the number of classification patterns of the systematic defect between the case where the alignment is displaced and the case where the alignment is appropriate. Moreover, the random defect has little pattern dependency, so that change in the number of classification patterns of the random defect for each alignment is small. For example, when a half of the defect group is the systematic defect, the difference in the number of classification patterns between the case where the alignment is appropriate and the case where the alignment is displaced becomes an intermediate value between the value when only the random defect is generated and the value when only the systematic defect is generated. In other words, there is a correlation between a degree to which the systematic defect accounts for in the defect group and the variation in the number of classification patterns of each alignment.

Therefore, in the first embodiment of the present invention, a plurality of alignments is set and the number of classification patterns is measured for each alignment, and the degree (i.e., pattern dependence degree) to which the systematic defect accounts for in the defect group is calculated by using the measured number of classification patterns of each alignment.

Figure 7:
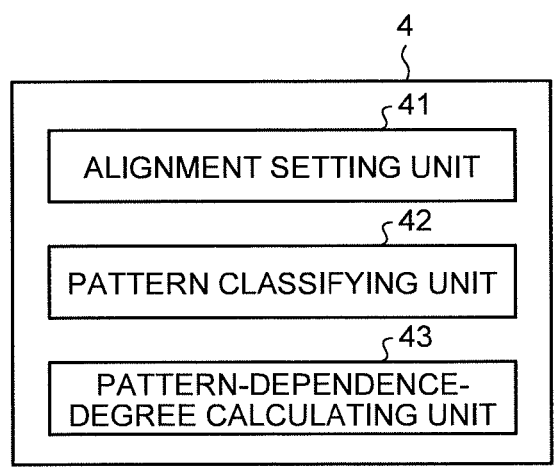
FIG. 7 is a diagram explaining a functional configuration of a defect analysis server.

FIG. 7 is a diagram explaining the functional configuration of the defect analysis server 4 that calculates the pattern dependence degree. As shown in FIG. 7, the defect analysis server 4 includes an alignment setting unit 41 that sets a plurality of alignments between the inspection data on a wafer as the inspection target and the design data on a pattern formed on the wafer, a pattern classifying unit 42 that performs alignment by using the alignment set by the alignment setting unit 41, extracts and classifies the extraction patterns, and determines the number of classification patterns, and a pattern-dependence-degree calculating unit 43 that calculates the pattern dependence degree based on the number of classification patterns of each alignment.

Figure 8:
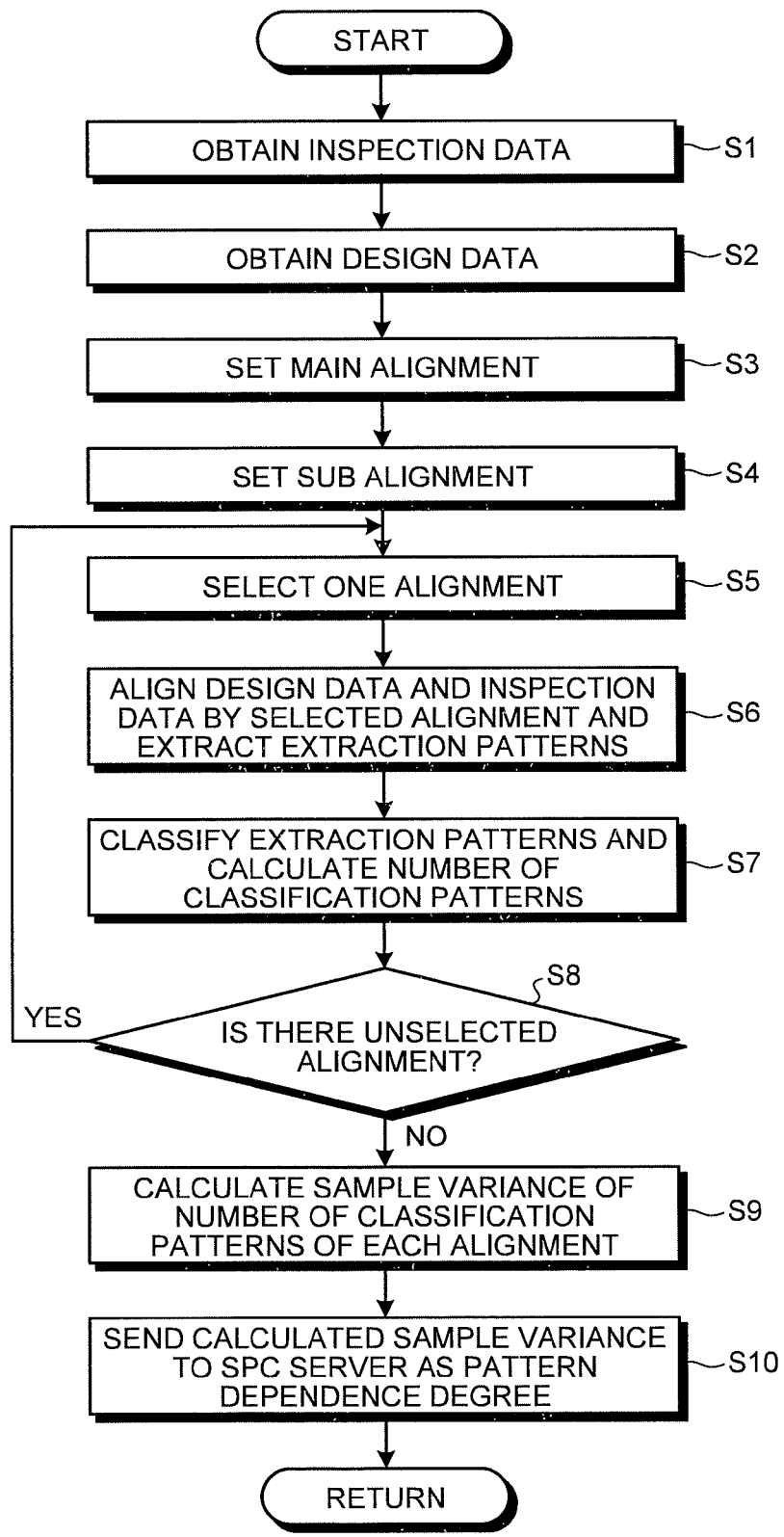
FIG. 8 is a flowchart explaining a defect analysis method in the first embodiment.

Next, the defect analysis method in the first embodiment performed by using the above defect analysis server 4 is explained. FIG. 8 is a flowchart explaining the defect analysis method in the first embodiment.

As shown in FIG. 8, the alignment setting unit 41 obtains the inspection data on the analysis target from the inspection data server 2 via the network (Step S1), and obtains the design data corresponding to the inspection data obtained at Step S1 from the design data server 3 via the network (Step S2).

Then, the alignment setting unit 41 sets a main alignment to be a reference for generating a plurality of alignments (Step S3). Specifically, a user inputs a positional relationship between the reference point in the inspection coordinate system and the reference point in the design coordinate system by using the user terminal 6, and the alignment setting unit 41 sets the input positional relationship as the main alignment. The alignment setting unit 41 adds a spacial displacement to the set main alignment to generate one or more sub alignments (Step S4).

It is sufficient that the main alignment is one close to the appropriate alignment, and it is applicable that the main alignment does not match the appropriate alignment. Moreover, it is applicable that the user matches a pattern image measured by the inspection device 1 with a pattern image of the design data to obtain the alignment and inputs the obtained alignment to the user terminal 6. Furthermore, it is applicable that all of the sub alignments are also input by the user.

Moreover, the displacement amount to be added when generating the sub alignments can be any value, and a distance that patterns having the same shape are classified into different classification patterns in the pattern classification can be set as the displacement amount. Furthermore, the displacement amount can be a value in which a technical node (half pitch width or the like) of a device pattern on a wafer to be a target is taken into consideration.

The pattern classifying unit 42 selects one of the alignments (main alignment and sub alignments) set by the alignment setting unit 41 (Step S5), aligns the inspection data and the design data based on the selected alignment, and extracts the extraction patterns of the detected defects (Step S6). The size of the extraction pattern extracted from one defect is not particularly limited, and, for example, can be a size in which a distance that the optical proximity effect affects is taken into consideration. For example, a few micrometer square rectangular shape whose center is a defect can be extracted.

Next, the pattern classifying unit 42 classifies the extraction patterns based on the degree of matching of graphical feature and calculates the number of classification patterns (Step S7). As the graphical feature, for example, at least one of a minimum line width, a minimum space width, a line width average value, a space width average value, a coverage, and the number of apexes is considered to be employed. A method is considered in which the above graphical feature is divided by a predetermined step size and the extraction patterns included in each divided range are determined to have a high degree of matching to be classified into the same classification pattern. As the degree of matching of graphical feature, for example, at least one of an exclusive OR, a crosscorrelation coefficient, a ratio of a minimum line width, a ratio of a minimum space width, a ratio of a line width average value, a ratio of a space width average value, a ratio of a coverage, and a ratio of the number of apexes between the extraction patterns is considered to be employed. For example, a method is considered in which the extraction patterns of which degree of matching of graphical feature is equal to or more than a predetermined threshold are classified into the same classification pattern. For classification based on the degree of matching of graphical feature, a known classification method such as a cluster analysis or a classification method to be newly developed in the future can be employed other than the method of classifying the extraction patterns of which degree of matching of graphical feature is equal to or more than a predetermined threshold into the same classification pattern as described above.

The pattern classifying unit 42 determines whether there is an unselected alignment among a plurality of alignments set by the alignment setting unit 41 (Step S8), and, when there is an unselected alignment (Yes at Step S8), moves to Step S5 and selects one unselected alignment.

When there is no unselected alignment (No at Step S8), the pattern-dependence-degree calculating unit 43 calculates a sample variance of the number of classification patterns of each alignment calculated by the pattern classifying unit 42 (Step S9). Then, the pattern-dependence-degree calculating unit 43 sends the calculated sample variance to the SPC server 5 as the pattern dependence degree of the wafer as the target (Step S10) and the operation returns.

Figure 9:
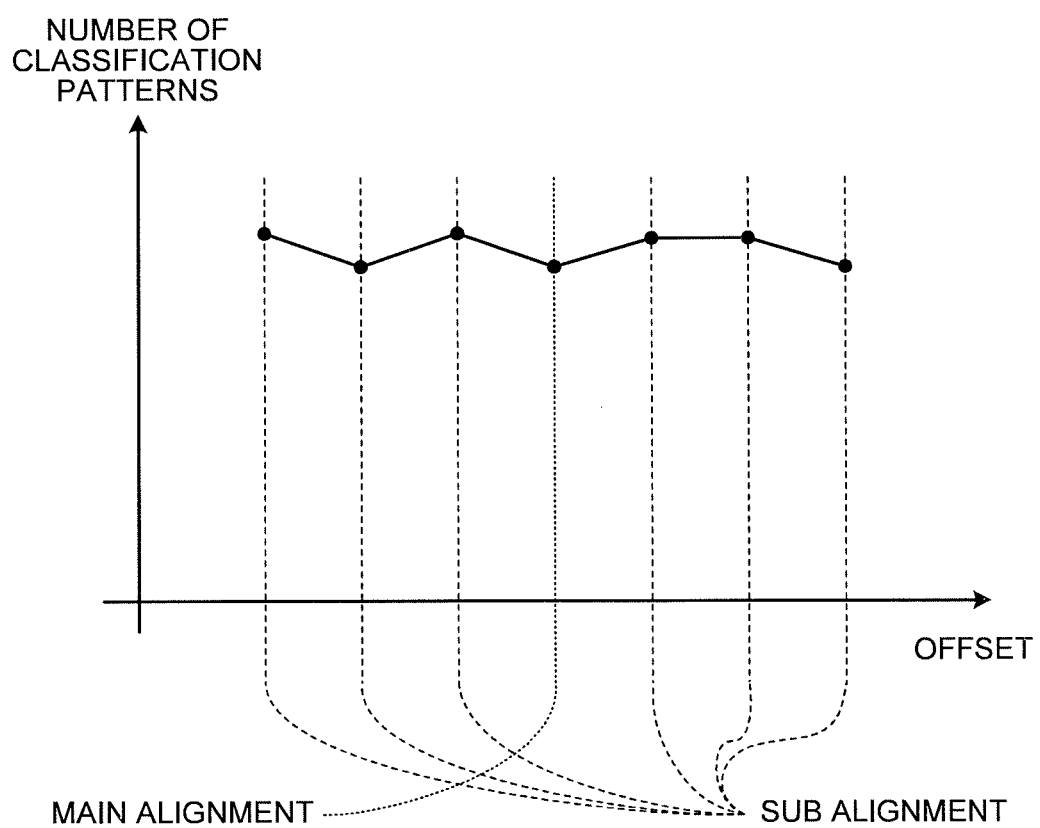
FIG. 9 is a graph illustrating a measured result of the number of classification patterns of each alignment.
Figure 10:
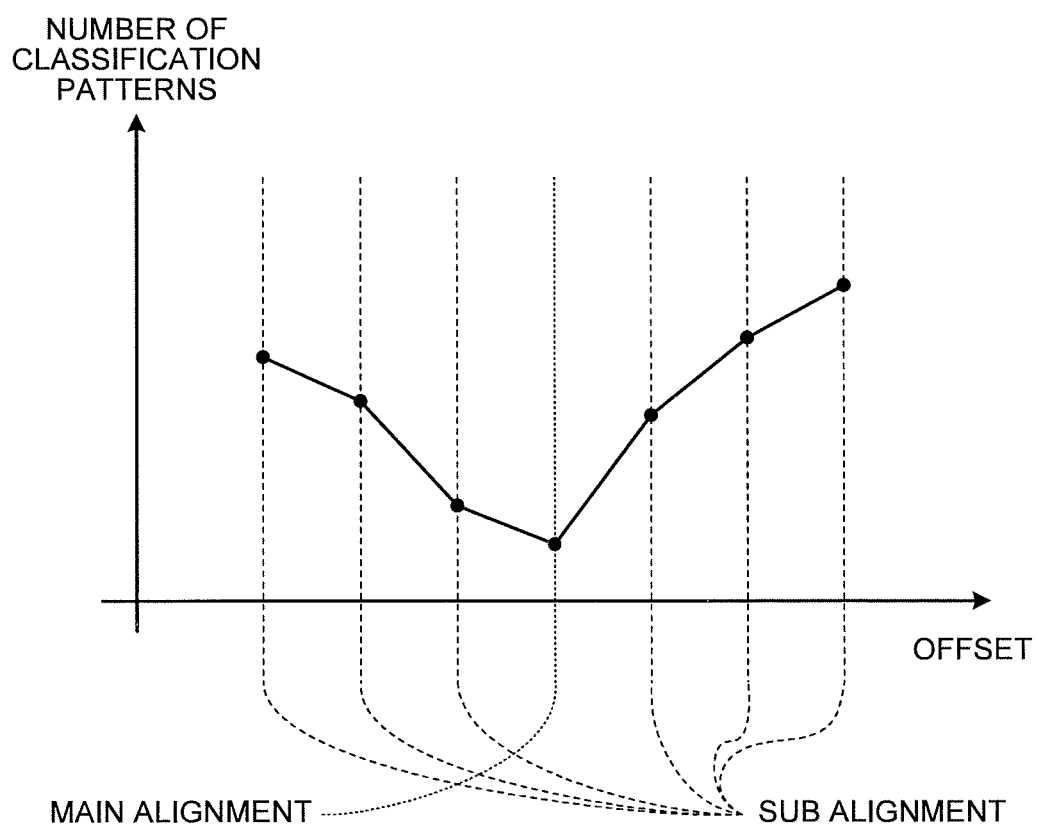
FIG. 10 is a graph illustrating a measured result of the number of classification patterns of each alignment.

FIG. 9 and FIG. 10 are graphs illustrating measured results of the number of classification patterns of each alignment. In the measured result shown in FIG. 10, change in the number of classification patterns of each alignment is large compared to the measured result shown in FIG. 9 and the sample variance also becomes a large value. Therefore, the user can determine that the systematic defect is generated on the wafer as the inspection target from which the measured result in FIG. 10 is obtained, in a ratio larger than the wafer from which the measured result in FIG. 9 is obtained, by comparing the sample variances.

Figure 11:
FIG. 11 is an example of a graph plotting a pattern dependence degree in a time sequence.

The series of processes illustrated in FIG. 8 are performed, for example, every time the inspection device 1 outputs the inspection data. The SPC server 5 controls each of the number of defects and the pattern dependence degree that are sequentially output as the inspection data in a time sequence, and, when the number of defects or the pattern dependence degree exceeds a preset control limit value, triggers an alarm to the user. It is applicable that the SPC server 5 outputs time sequence information on the number of defects and the pattern dependence degree to the user terminal 6 in the form set by the user. For example, it is applicable to generate a graph in which the number of defects and the pattern dependence degree are plotted with elapsed time as a horizontal axis and output the graph to the user terminal 6. FIG. 11 is an example of a graph in which the pattern dependence degree is plotted in a time sequence. Alternatively, it is applicable to generate a table in which the number of defects and the pattern dependence degree are arranged in a descending order or an ascending order with respect to elapsed time instead of the graph and output the generated table to the user terminal 6. In this manner, the SPC server 5 controls the pattern dependence degree in a time sequence, so that when the number of defects increases, the user can promptly and accurately determine which one of the systematic defect and the random defect increases by checking the time sequence information on the pattern dependence degree, whereby an appropriate modification can be performed on the manufacturing process of a semiconductor integrated circuit.

Figure 12:
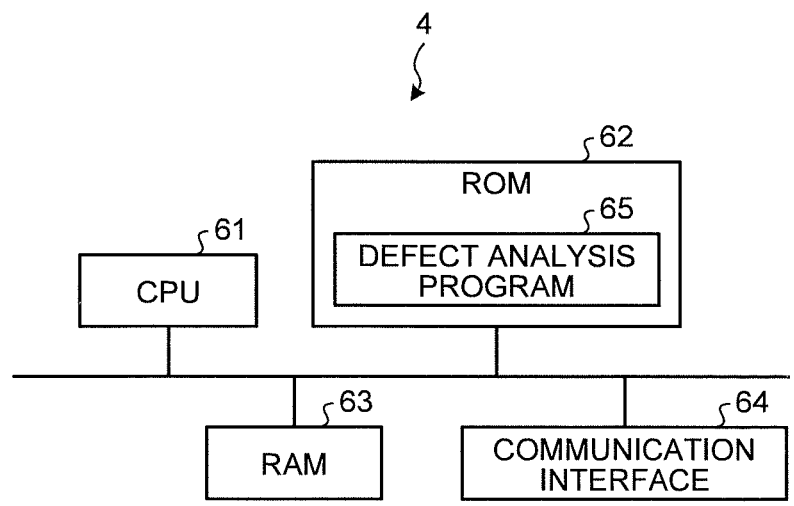
FIG. 12 is a diagram explaining an example of a hardware configuration of a defect analysis server.

The defect analysis server 4 can be realized by using a conventional computer. FIG. 12 is a diagram explaining an example of the hardware configuration of the defect analysis server 4. As shown in FIG. 12, the defect analysis server 4 includes a CPU (Central Processing Unit) 61, a ROM (Read Only Memory) 62, a RAM (Random Access Memory) 63, and a communication interface 64. The CPU 61, the ROM 62, the RAM 63, and the communication interface 64 are connected with each other via a bus line.

The CPU 61 executes a defect analysis program 65 that is a computer program that executes the defect analysis method in the first embodiment. Specifically, the defect analysis program 65 is stored in the ROM 62 and is loaded in the RAM 63 via the bus line. The CPU 61 executes the defect analysis program 65 loaded in the RAM 63. The defect analysis program 65 has a module configuration including the above described functional components (the alignment setting unit 41, the pattern classifying unit 42, and the pattern-dependence-degree calculating unit 43). The above each unit is loaded in the RAM 63, so that the alignment setting unit 41, the pattern classifying unit 42, and the pattern-dependence-degree calculating unit 43 are generated on the RAM 63. The communication interface 64 is an interface for accessing the above described network, and the inspection data, setting data, and the input contents from the user terminal 6 are input via the communication interface 64. Moreover, the number of defects and the calculated pattern dependence degree are output to the SPC server 5 via the communication interface 64.

The defect analysis program 65 can be stored in a storage device such as a DISK instead of the ROM 62, and the defect analysis program 65 can be loaded in a storage device such as a DISK instead of the RAM 63. Moreover, the defect analysis program 65 can be provided or distributed in such a way that the defect analysis program 65 is stored in a computer connected to a network such as the Internet and is downloaded via the network.

The inspection data server 2 and the design data server 3 can also be realized by a computer. Moreover, it is applicable to use a computer that includes an output device such as a CRT display, a liquid crystal display, and a printer, and an input device configured to include a mouse and a keyboard, in addition to the CPU, the ROM, the RAM, and the communication interface, as the user terminal 6.

Furthermore, at least two of the inspection data server 2, the design data server 3, the defect analysis server 4, the SPC server 5, and the user terminal 6 can be realized by one computer. Moreover, if the inspection device 1 includes a control computer, any device among the inspection data server 2, the design data server 3, the defect analysis server 4, the SPC server 5, and the user terminal 6 can be realized by the control computer.

In this manner, according to the first embodiment of the present invention, the configuration is such that a plurality of alignments is set, the defect coordinates output by the inspection device 1 and the design data are aligned by using each set alignment, and the extraction patterns at the position at which the defect coordinates are aligned are extracted from the design data for each alignment, the extracted extraction patterns are classified based on the degree of matching of graphical feature and the number of classification patterns is calculated for each alignment, and the pattern dependence degree of the defect group generated on the wafer is calculated by using the calculated number of classification patterns of each alignment, so that the pattern dependency of the defect group can be quantified.

It is considered to determine whether the systematic defect is generated on the inspection target by utilizing the above described tendency 1. This technology is defined as a technology in a comparison example. However, according to the tendency 2, the number of classification patterns and the number of extraction patterns classified for each classification pattern changes depending on the way of determining the alignment. Therefore, for quantifying the degree to which the systematic defect is included by using only the tendency 1, the alignment always needs to be the appropriate alignment, so that a high skill is required for this operation. On the contrary, according to the first embodiment of the present invention, it is sufficient that one of a plurality of alignments is close to the appropriate alignment, so that the alignment does not need to be constant every time. In other words, according to the first embodiment of the present invention, the degree to which the systematic defect is included can be easily quantified compared to the technology in the comparison example.

In the first embodiment, the sample variance of the number of classification patterns of each alignment is provided as the pattern dependence degree. In a second embodiment, the pattern dependence degree is calculated by a calculation method different from that in the first embodiment. In the following, the second embodiment is explained.

The configuration of a defect analysis system in the second embodiment is equivalent to the configuration in the first embodiment shown in FIG. 2 except for the defect analysis server, so that explanation of the configuration of the defect analysis system in the second embodiment is omitted. The defect analysis server in the second embodiment is given a reference numeral "7" to be distinguished from the defect analysis server 4 in the first embodiment.

Figure 13:
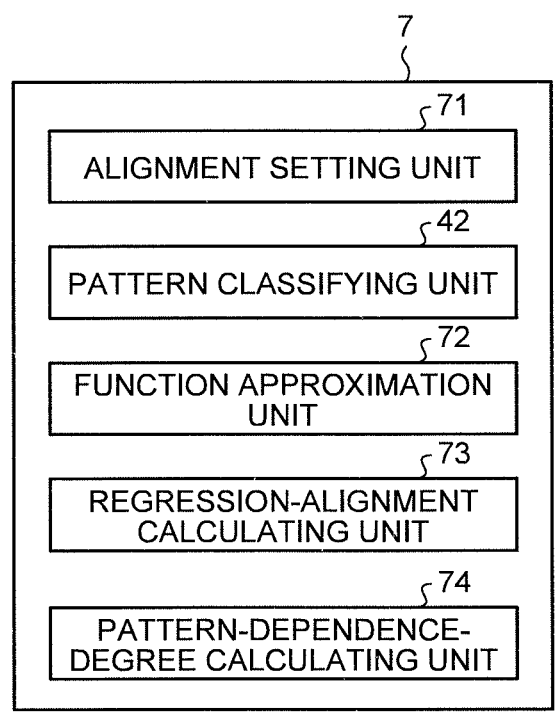
FIG. 13 is a diagram explaining a functional configuration of a defect analysis server in a second embodiment.

FIG. 13 is a diagram explaining a functional configuration of a defect analysis server 7 in the second embodiment. As shown in FIG. 13, the defect analysis server 7 includes an alignment setting unit 71, the pattern classifying unit 42, a function approximation unit 72, a regression-alignment calculating unit 73, and a pattern-dependence-degree calculating unit 74. These functional components are realized by executing the defect analysis program 65 on a computer same as the first embodiment.

The pattern classifying unit 42 is the same as the functional component of the same name in the first embodiment, so that explanation thereof is omitted.

The function approximation unit 72 performs function approximation on a relationship between the displacement amount and the number of classification patterns of each alignment. As the function approximation method by the function approximation unit 72, a known function approximation method or a function approximation method to be newly developed in the future can be employed.

The regression-alignment calculating unit 73 calculates the displacement amount with which the number of classification patterns becomes minimum from the relationship between the displacement amount and the number of classification patterns of each alignment on which the function approximation is performed. As described above, if the alignment is appropriate, the number of classification patterns becomes minimum. Therefore, if the alignment is displaced from the main alignment by the calculated displacement amount, the alignment that is closer to the appropriate alignment is obtained. The regression-alignment calculating unit 73 calculates the alignment (regression alignment) closer to the appropriate alignment.

Figure 14:
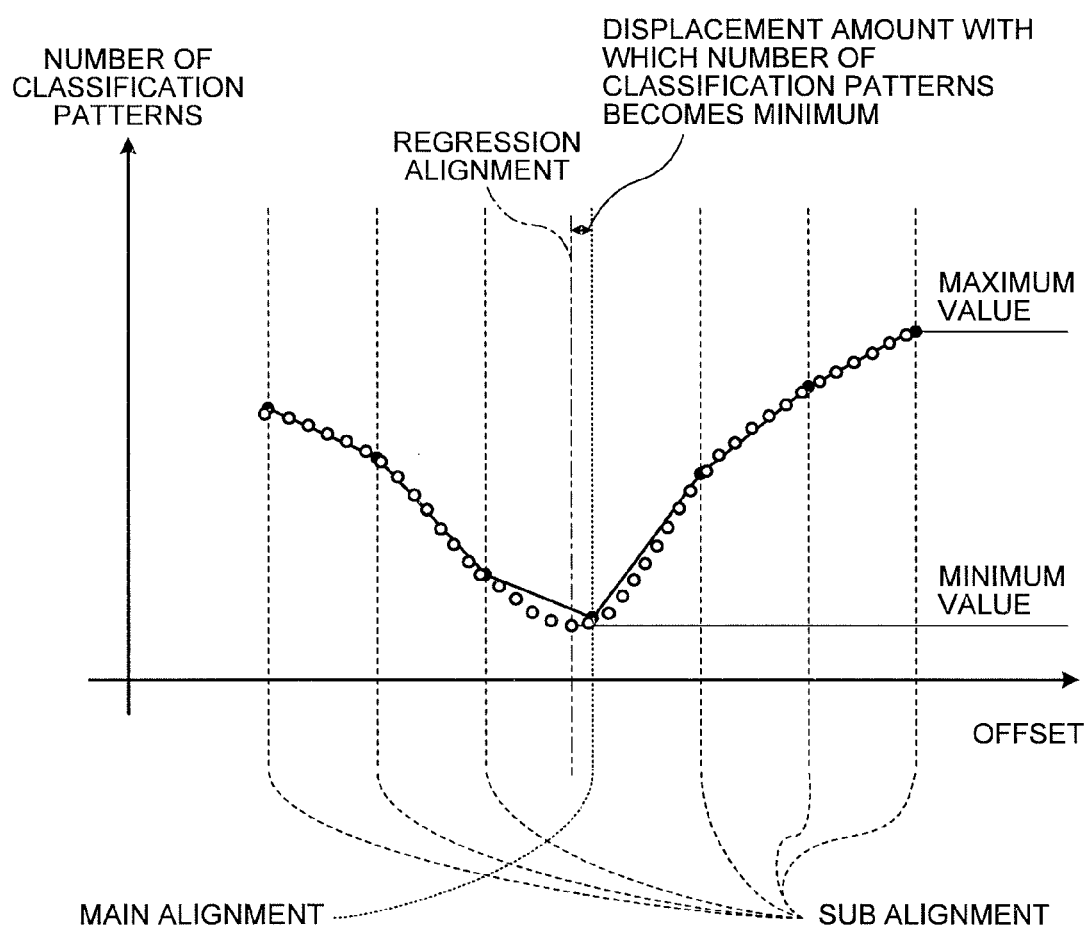
FIG. 14 is a graph illustrating a curve subjected to function approximation.

FIG. 14 is a graph illustrating a curve subjected to the function approximation. In FIG. 14, the curve subjected to the function approximation is illustrated by open circle dots. As shown in FIG. 14, the displacement amount between the sub alignments is interpolated by the function approximation and the minimum value of the number of classification patterns appears at a position displaced from the main alignment. The regression-alignment calculating unit 73 obtains this displacement amount and sets the alignment displaced by the obtained displacement amount as a regression alignment.

In the initial state, the alignment setting unit 71 sets the main alignment and the sub alignments by the same procedure as the functional components of the same name in the first embodiment, and sends the set alignments to the pattern classifying unit 42. Thereafter, when the regression-alignment calculating unit 73 calculates the regression alignment, the alignment setting unit 71 feeds back the calculated regression alignment to the main alignment. In other words, the alignment setting unit 71 sets the regression alignment calculated by the regression-alignment calculating unit 73 as a new main alignment, and sets one or more sub alignments by displacing the newly set main alignment by a predetermined displacement amount.

The pattern-dependence-degree calculating unit 74 divides the difference between the maximum value and the minimum value of the approximated function by the minimum value and sets the value obtained by the division as the pattern dependence degree.

Figure 15:
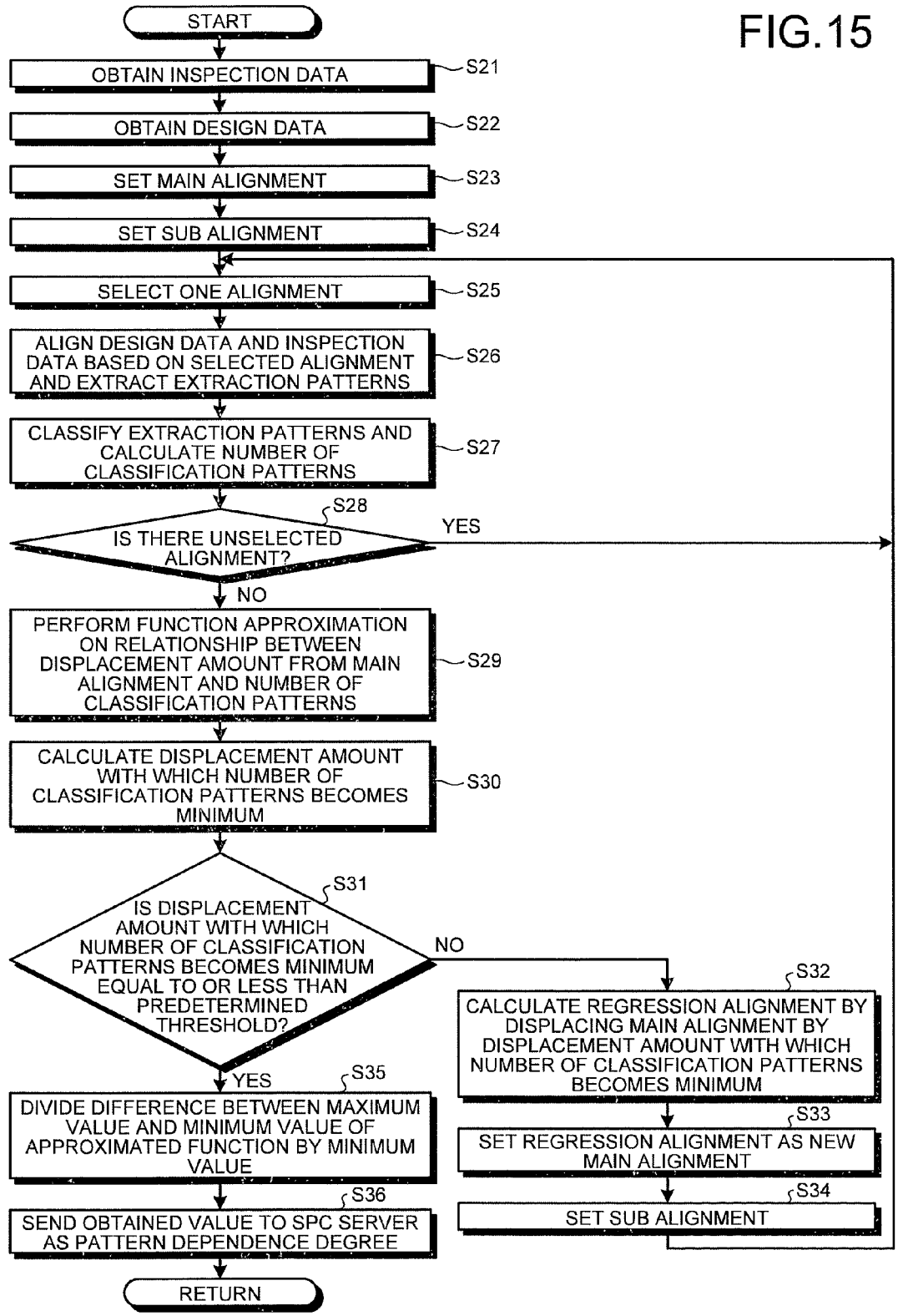
FIG. 15 is a flowchart explaining a defect analysis method in the second embodiment.

Next, the defect analysis method in the second embodiment realized by using the defect analysis server 7 is explained. FIG. 15 is a flowchart explaining the defect analysis method in the second embodiment.

First, the alignment setting unit 71 performs processes similar to Step S1 to Step S5 at Step S21 to Step S25 respectively.

The pattern classifying unit 42 selects one of the alignments set by the alignment setting unit 71 (Step S25), and aligns the inspection data and the design data based on the selected alignment and extracts the extracted extraction patterns of the detected defects (Step S26). Then, the pattern classifying unit 42 classifies the extraction patterns based on the degree of matching of graphical feature and calculates the number of classification patterns (Step S27).

Then, the pattern classifying unit 42 determines whether there is an unselected alignment among a plurality of alignments set by the alignment setting unit 71 (Step S28), and, when there is an unselected alignment (Yes at Step S28), moves to Step S25 and selects one unselected alignment.

When there is no unselected alignment (No at Step S28), the function approximation unit 72 performs the function approximation on the relationship between the displacement amount from the main alignment and the number of classification patterns (Step S29).

The regression-alignment calculating unit 73 obtains the displacement amount with which the number of classification patterns becomes minimum from the curve subjected to the function approximation (Step S30), and determines whether the obtained displacement amount is equal to or less than a predetermined threshold (Step S31). When the displacement amount is not equal to or less than the predetermined threshold (No at Step S31), the regression-alignment calculating unit 73 calculates the regression alignment by displacing the main alignment by the obtained displacement amount (Step S32). The alignment setting unit 71 sets the regression alignment as the main alignment (Step S33) and sets one or more sub alignments (Step S34).

When the displacement amount is equal to or less than the predetermined threshold (Yes at Step S31), the pattern-dependence-degree calculating unit 74 divides the difference between the maximum value and the minimum value of the curve subjected to the function approximation by the minimum value to calculate the pattern dependence degree (Step S35) and outputs the calculated pattern dependence degree to the SPC server 5 (Step S36), and the operation returns.

In this manner, according to the second embodiment of the present invention, the relationship between the number of classification patterns and the displacement amount from the main alignment is subjected to the function approximation, the maximum value and the minimum value of the number of classification patterns are obtained by using the curve subjected to the function approximation, and the value obtained by dividing the difference between the obtained maximum value and minimum value of the number of classification patterns by the minimum value is set as the pattern dependence degree. It is applicable to calculate the pattern dependence degree by using the maximum value and the minimum value in the number of classification patterns of each alignment without performing the function approximation.

Moreover, the configuration is such that the displacement amount with which the number of classification patterns becomes minimum is calculated from the curve subjected to the function approximation, the regression alignment is calculated by displacing the main alignment by the calculated displacement amount, and the calculated regression alignment is fed back to the main alignment, so that even when there is a variation in the setting of the main alignment by the user, the effect of the variation that affects the pattern dependence degree to be calculated can be made small. Moreover, it can be said that the main alignment obtained by repeating the feedback is the alignment closest to the appropriate alignment among the main alignments obtained during the feedback. The second embodiment can be also used as a method for obtaining the alignment close to the appropriate alignment as much as possible.

The inspection device performs the defect inspection based on an inspection recipe on which an optical condition or the like at the inspection is set. The pattern dependency occurs on a defect detection sensitivity of the inspection device depending on the setting of the inspection recipe in some cases. When the pattern dependency occurs on the defect detection sensitivity, a specific defect type may be overlooked. Moreover, the pattern dependence degree cannot be accurately obtained. Therefore, it is desired to generate a robust inspection recipe with which a uniform detection rate can be obtained for the defect types as many as possible.

The defect analysis system in the present embodiment of the present invention can be used in applications where a robust inspection recipe is obtained as quickly as possible. In the following, a method of generating the inspection recipe of the inspection device by using the defect analysis system is explained.

Figure 16:
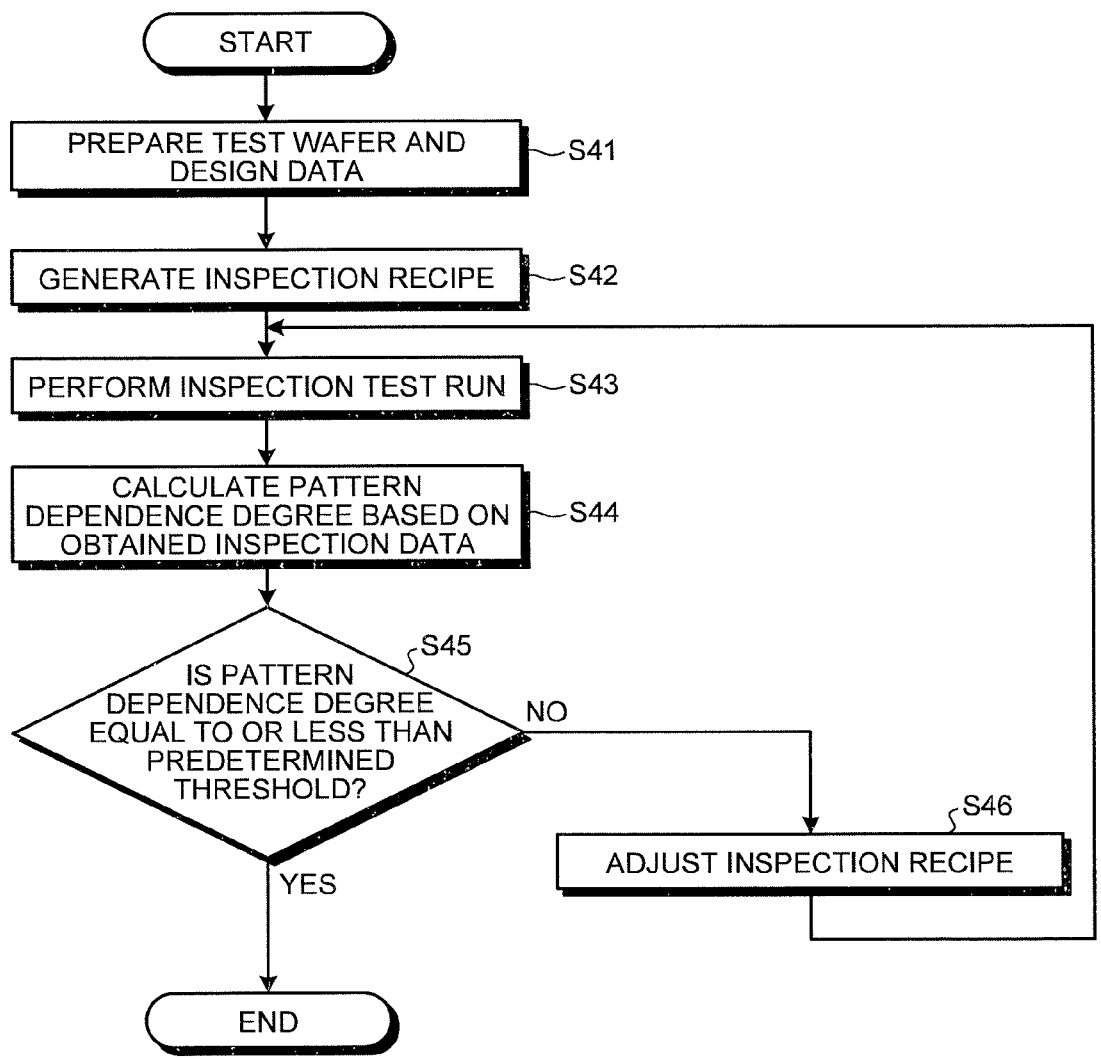
FIG. 16 is a flowchart explaining a method of generating an inspection recipe in a third embodiment.

FIG. 16 is a flowchart explaining the method of generating the inspection recipe in a third embodiment. As shown in FIG. 16, first, a user prepares a wafer (test wafer) for test on which defects are generated and the design data on the wafer (Step S41). The wafer for test, on which the systematic defect is not generated, is used. The prepared design data is stored in the design data server 3.

Then, the user generates the inspection recipe and sets the generated inspection recipe to the inspection device 1 by operating the user terminal 6 (Step S42). Then, a test run of the inspection device 1 is performed and the defect detection of the prepared test wafer is performed (Step S43). Then, the pattern dependence degree is calculated by performing the defect analysis method in the first embodiment or the second embodiment based on the obtained inspection data and the design data prepared at Step S41 (Step S44).

Then, the user determines whether the calculated pattern dependence degree is equal to or less than a predetermined threshold (Step S45). Because the wafer on which the systematic defect is not generated is selected as the test wafer at Step S41, when the optical sensitivity of the inspection device 1 has no pattern dependency, the pattern dependence degree ideally becomes zero. The user sets an allowable upper limit value of the pattern dependence degree in advance, and when the pattern dependence degree becomes lower than the upper limit value at Step S45 (Yes at Step S45), the user can determine that the robustness of the inspection recipe at this time is within the allowable range, so that the process ends.

At Step S45, when the calculated pattern dependence degree exceeds the threshold (No at Step S45), the user adjusts the inspection recipe (Step S46) and performs a test run again by using the adjusted inspection recipe (Step S43).

It is explained that the processes at Step S42, Step S45, and Step S46 are performed by the user; however, part or all of the processes at Step S42, Step S45, and Step S46 can be automatically performed by a computer or the like.

In this manner, according to the third embodiment of the present invention, the inspection target is the test wafer on which the defect group with no pattern dependency is generated, so that it is possible to determine whether the inspection recipe is robust. Consequently, a robust inspection recipe can be generated as quickly as possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A defect analysis method comprising:
   setting a plurality of positional relationships between a coordinate system for indicating a defect position that is used by an inspection device that detects a defect generated on a wafer on which a pattern is formed and outputs a generation position of detected defect and a coordinate system that is used in design data on the pattern;
   aligning the defect position output by the inspection device and the design data by using each of set positional relationships;
   extracting a local pattern of a portion in which the defect position is aligned from the design data for each of the positional relationships;
   classifying extracted local pattern based on a degree of matching of graphical feature;
   calculating number of classification patterns for each of the positional relationships; and
   calculating a pattern dependence degree of detected defect group by using calculated number of classification patterns of each of the positional relationships,
   wherein the pattern dependence degree is one of:

a sample variance of the number of classification patterns of each of the positional relationships, or a value obtained by dividing a difference between a maximum value and a minimum value of the number of classification patterns by the minimum value.

2. The defect analysis method of claim 1, wherein:

the pattern dependence degree is the value obtained by dividing the difference by the minimum value, the positional relationships include a reference positional relationship, the method further includes performing a function approximation on a relationship between the number of classification patterns and a displacement amount of each of the positional relationships from the reference positional relationship after the calculating the number of classification patterns for each of the positional relationships, and the calculating the pattern dependence degree includes obtaining the maximum value and the minimum value of the number of classification patterns by using a curve subjected to the function approximation.

3. The defect analysis method of claim 2, further comprising:

calculating a displacement amount with which the number of classification patterns becomes minimum from the curve subjected to the function approximation after the performing the function approximation on the relationship between the number of classification patterns and the displacement amount of each of the positional relationships from the reference positional relationship; and calculating a regression positional relationship obtained by displacing the reference positional relationship by calculated displacement amount, wherein the setting the plurality of positional relationships includes setting calculated regression positional relationship as a new reference positional relationship, and generating a plurality of positional relationships by displacing the new reference positional relationship by a predetermined displacement amount.

4. The defect analysis method of claim 1, further comprising controlling calculated pattern dependence degree in a time sequence.

5. The defect analysis method of claim 1, wherein the wafer is a test wafer on which a defect group with no pattern dependency is generated, and the method further includes determining whether an inspection recipe of the inspection device needs to be adjusted based on calculated pattern dependence degree.

6. A defect analysis apparatus comprising:

an alignment setting unit that sets a plurality of positional relationships between a coordinate system for indicating a defect position that is used by an inspection device that detects a defect generated on a wafer on which a pattern is formed and outputs a generation position of detected defect and a coordinate system that is used in design data on the pattern;

a pattern classifying unit that aligns the defect position output by the inspection device and the design data by using each of the positional relationships set by the alignment setting unit, extracts a local pattern of a portion in which the defect position is aligned from the design data for each of the positional relationships, and classifies extracted local pattern based on a degree of matching of graphical feature; and a pattern-dependence-degree calculating unit that calculates a pattern dependence degree of detected defect group by using number of classification patterns of each of the positional relationships obtained by the pattern classifying unit, wherein the pattern dependence degree is one of:

a sample variance of the number of classification patterns of each of the positional relationships, or a value obtained by dividing a difference between a maximum value and a minimum value of the number of classification patterns by the minimum value.

7. The defect analysis apparatus of claim 6, wherein:

the pattern dependence degree is the value obtained by dividing the difference by the minimum value, the positional relationships include a reference positional relationship, the apparatus further includes a function approximation unit that performs a function approximation on a relationship between the number of classification patterns and a displacement amount of each of the positional relationships from the reference positional relationship, and the pattern-dependence-degree calculating unit obtains the maximum value and the minimum value of the number of classification patterns by using a curve subjected to the function approximation.

8. The defect analysis apparatus of claim 7, further comprising a regression-alignment calculating unit that calculates a displacement amount with which the number of classification patterns becomes minimum from the curve subjected to the function approximation and calculates a regression positional relationship obtained by displacing the reference positional relationship by calculated displacement amount, wherein the alignment setting unit sets calculated regression positional relationship as a new reference positional relationship, and generates a plurality of positional relationships by displacing the new reference positional relationship by a predetermined displacement amount.

9. The defect analysis apparatus of claim 6, further comprising a SPC server unit that controls calculated pattern dependence degree in a time sequence.

10. A non-transitory computer readable medium comprising instructions that cause a computer to execute:

setting a plurality of positional relationships between a coordinate system for indicating a defect position that is used by an inspection device that detects a defect generated on a wafer on which a pattern is formed and outputs a generation position of detected defect and a coordinate system that is used in design data on the pattern;

aligning the defect position output by the inspection device and the design data by using each of set positional relationships;

extracting a local pattern of a portion in which the defect position is aligned from the design data for each of the positional relationships;

classifying extracted local pattern based on a degree of matching of graphical feature;

calculating number of classification patterns for each of the positional relationships; and calculating a pattern dependence degree of detected defect group by using calculated number of classification patterns of each of the positional relationships, wherein the pattern dependence degree is one of:

a sample variance of the number of classification patterns of each of the positional relationships, or a value obtained by dividing a difference between a maximum value and a minimum value of the number of classification patterns by the minimum value.

11. The computer readable medium of claim 10, wherein:
the pattern dependence degree is the value obtained by dividing the difference by the minimum value,
the positional relationships include a reference positional relationship,
the instructions further cause the computer to execute performing a function approximation on a relationship between the number of classification patterns and a displacement amount of each of the positional relationships from the reference positional relationship after the calculating the number of classification patterns for each of the positional relationships, and
the calculating the pattern dependence degree includes obtaining the maximum value and the minimum value of the number of classification patterns by using a curve subjected to the function approximation.

12. The computer readable medium of claim 11, wherein the instructions further cause the computer to execute
calculating a displacement amount with which the number of classification patterns becomes minimum from the curve subjected to the function approximation after the performing the function approximation on the relationship between the number of classification patterns and the displacement amount of each of the positional relationships from the reference positional relationship; and
calculating a regression positional relationship obtained by displacing the reference positional relationship by calculated displacement amount, and
the setting the plurality of positional relationships includes setting calculated regression positional relationship as a new reference positional relationship, and
generating a plurality of positional relationships by displacing the new reference positional relationship by a predetermined displacement amount.

13. The computer readable medium of claim 10, wherein the instructions further cause the computer to execute controlling calculated pattern dependence degree in a time sequence.

14. The computer readable medium of claim 10, wherein the wafer is a test wafer on which a defect group with no pattern dependency is generated, and
the instructions further cause the computer to execute determining whether an inspection recipe of the inspection device needs to be adjusted based on calculated pattern dependence degree.

* * * * *